J. MERRITT.
GASKET CUTTING APPARATUS.
APPLICATION FILED MAY 6, 1907.
1,075,488.
Patented Oct. 14, 1913.
2 SHEETS—SHEET 1.
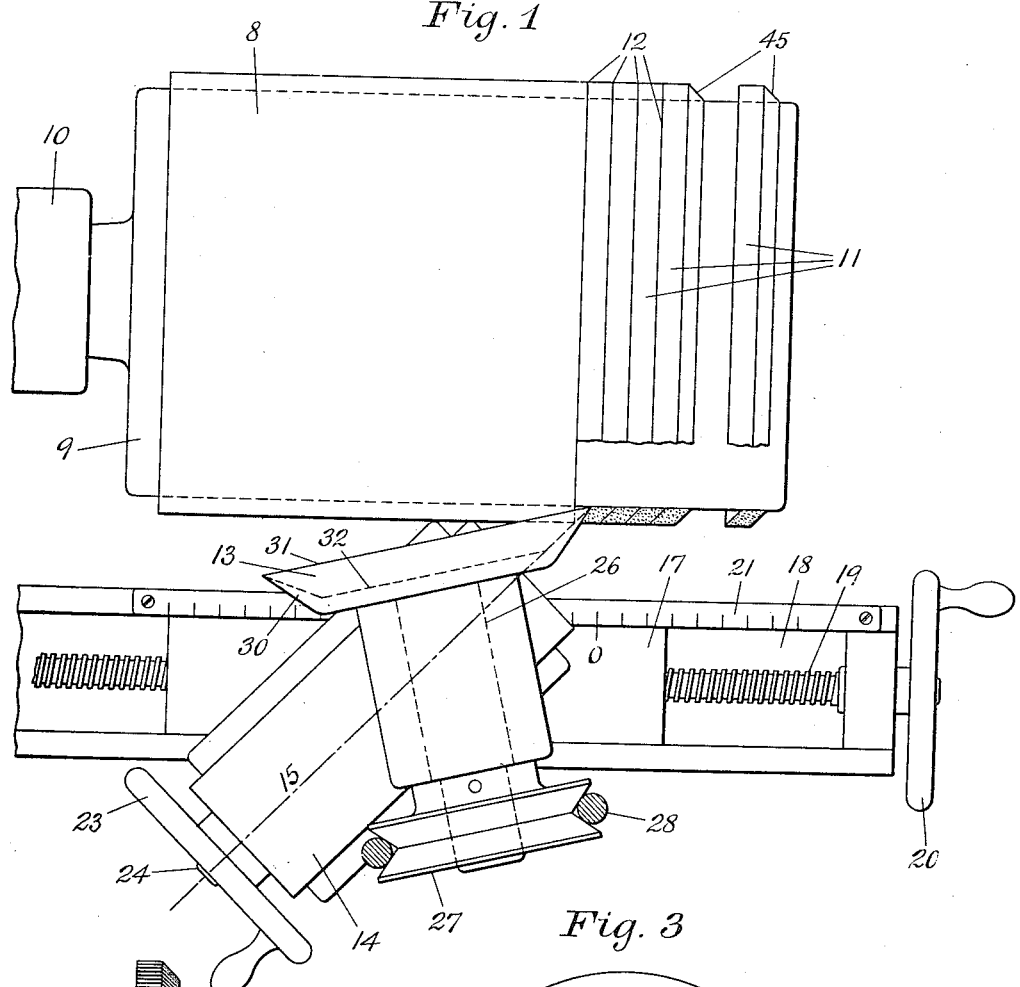
Fig. 1
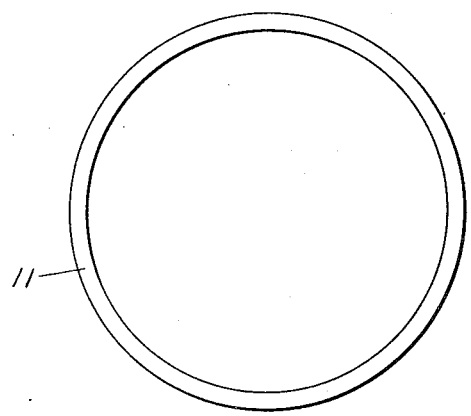
Fig. 2
Fig. 3
Witnesses:
H. Mallner
James S. Ellsworth
Inventor
Joseph Merritt
By W. H. Honiss Atty.

J. MERRITT.
GASKET CUTTING APPARATUS.
APPLICATION FILED MAY 6, 1907.

1,075,488.

Patented Oct. 14, 1913.

2 SHEETS—SHEET 2.

Witnesses:
H. Mallner
Janette S. Ellsworth

Inventor
Joseph Merritt
By W. H. Honiss Atty.

UNITED STATES PATENT OFFICE.

JOSEPH MERRITT, OF HARTFORD, CONNECTICUT, ASSIGNOR, BY DIRECT AND MESNE ASSIGNMENTS, OF ONE-HALF TO BEECH-NUT PACKING COMPANY, OF CANAJOHARIE, NEW YORK, A CORPORATION OF NEW YORK, AND ONE-FOURTH TO WILLIAM A. LORENZ AND ONE-FOURTH TO WILLIAM H. HONISS, OF HARTFORD, CONNECTICUT.

GASKET-CUTTING APPARATUS.

1,075,488.

Specification of Letters Patent.  Patented Oct. 14, 1913.

Original application filed March 20, 1906, Serial No. 307,005. Divided and this application filed May 6, 1907. Serial No. 372,662.

*To all whom it may concern:*

Be it known that I, JOSEPH MERRITT, a citizen of the United States, and resident of Hartford, in the county of Hartford and State of Connecticut, have invented certain new and useful Improvements in Gasket-Cutting Apparatus, of which the following is a full, clear, and exact specification.

This invention comprises an improved cutting apparatus and is adapted to operate in accordance with the process described and claimed in my application for Letters Patent of the United States Serial No. 307,005, filed March 20, 1906, of which this is a divisional application.

Figure 4:
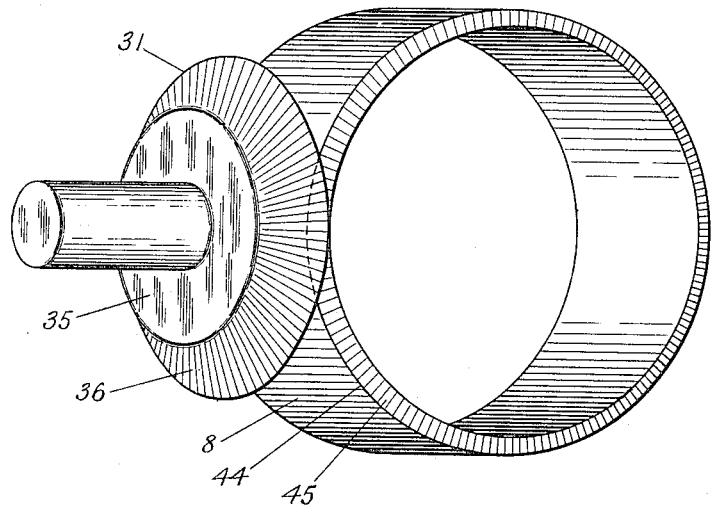
Figure 5:
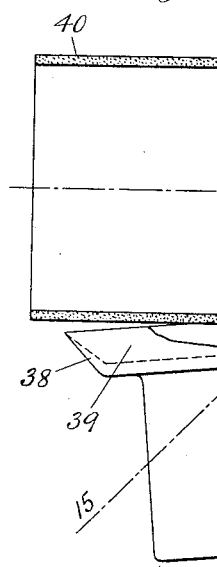
Figure 6:
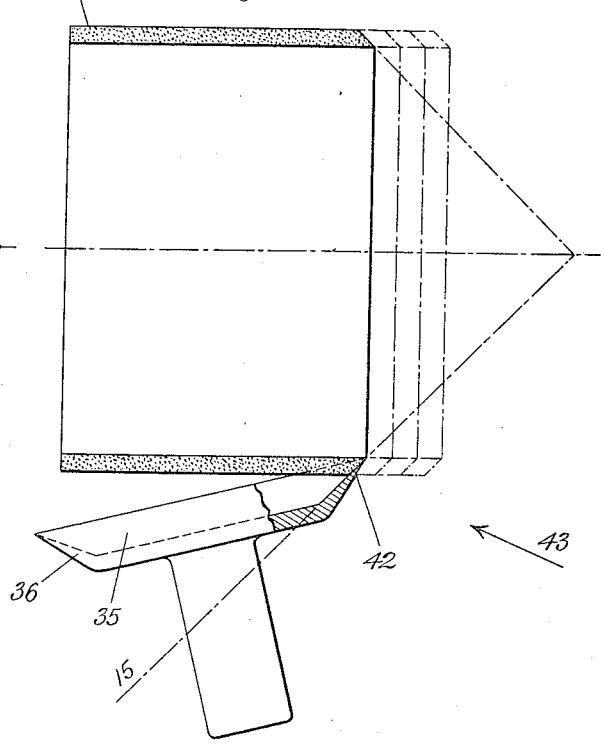

Figure 1 is a plan view representing my improved apparatus. Fig. 2 is a plan view partly in section and Fig. 3 is an end view illustrating an angular gasket which the present apparatus is more particularly adapted to make. Fig. 4 is an isometric view illustrating the relation of the dished cutter to the tube from which the gaskets are severed by that cutter. Figs. 5 and 6 are plan views illustrating some of the differences in form, diameter and relative position of the cutter required to adapt it to the cutting of angular gaskets of different diameters.

The angular gasket shown in Figs. 2 and 3 is intended for use in closures employed for the hermetic sealing of cans, jars, tumblers and similar receptacles, and is shown, described and claimed in U. S. Patent No. 826,104 granted July 17, 1906 to William H. Honiss. One of the recognized advantages in this form of gasket, in addition to its ultimate utility in the closure itself, is that its form enables it to be manufactured without waste from a tube of rubber or other suitable gasket material by severing the gaskets successively from the end of a tube, as shown in the aforesaid applications, by means of a circumferential cut penetrating the wall of the tube at an acute angle to the longitudinal center of the tube. It is desirable to make the separating cuts so as to leave the cut surfaces uniformly smooth, in view of their subsequent use in the making of air tight joints. The known processes, tools and apparatus are unsuited for the manufacture of these gaskets, and particularly to make them with sufficient smoothness and rapidity for practical and commercial purposes. This is largely due to the fact that known tools and processes are not adapted to the making of the peculiar conical cut through the annular wall of the tube, and extending that cut smoothly around the circumference of the tube, since the tools themselves do not conform to the conical contour of such a cut, and hence do not clear the cut surfaces properly, but are liable to scrape or score those surfaces. In the present invention these difficulties are overcome by employing a cutter having a conical cutting blade which penetrates the wall of the tube in approximate conformity with the conical surface of the angular side of the gasket. This cutter is supported at the side of the tube and is moved back and forth in a line which carries the cutting edge through the wall of the tube at the proper angle, the tube or the cutter being advanced in the direction of the length of the tube, at the intervals between the cuts, so as to make the gaskets of the desired length. This conical or dished cutter and the tube of gasket material may be mounted and manipulated in various ways in conformity with this process to penetrate the wall of the tube at the desired angle; and to extend the cut at that angle circumferentially around the tube. For example, the tube may be supported for rotation, and the non-rotating cutter supported for movement in a path which carries it through the wall of the rotating tube at the proper angle, and at the desired intervals. Or the tube may be supported without rotation, and the cutter be mounted for rotation in an arm which revolves the cutter around the tube, the cutter being moved inwardly toward its center of revolution, so as to have its cutting edge penetrate the wall of the tube at the required angle. But I prefer to carry out this process with the apparatus arranged as shown in Fig. 1, in which the tube 8 is mounted on a mandrel 9, and that mandrel is supported for rotation in any convenient way, as upon a spindle 10; and the gaskets 11 are successively separated from the tube by the successive cuts 12 made by the cutter 13, which is mounted for rotation in a cutter slide 14, the latter being mounted for sliding movement in a direction parallel with the line 15 of the angular cut. The slide 14 is mounted upon a carriage 17, which is mounted for longitudinal movement on a bed 18, in a direction parallel with the longitudinal center of the tube, being moved in that direction during the intervals between the cuts, in any convenient way, as by means of the feed screw 19. That feed screw may be turned automatically to the extent required to feed the cutter from one cutting position to another. In the present instance, however, it is shown to be provided with a handwheel 20, by means of which the screw may be manually turned, the extent of movement being indicated by the zero mark upon the carriage 17, in connection with the graduations of the scale 21, which scale may be removed and replaced by other scales suited to the different lengths of the gaskets required.

The cutter slide 14 may be moved back and forth to carry the edge of the cutter through the wall of the tube in any convenient way, as by a hand lever, or, as herein shown, by means of a handwheel 23, and screw 24. When thus mounted and operated the cutter 13 is preferably provided with a central shank or stem 26, which is journaled in the slide 14, and has fixed upon its outward end the pulley 27 driven by the belt 28 from any convenient shaft or motor.

The flaring portion 30 of the cutter adjacent to the cutting edge 31 of the blade may extend directly to the central stem of the cutter, especially where the cutters are of small diameter. But for convenience in the manufacture and sharpening of these cutters, the annular flaring portion is made comparatively shallow, joining with the stem by means of a flat web 32.

The diameter of the cutter and the angle of the flare are the two factors which determine its adaptability for coinciding with the circumferential cuts by which the gaskets are separated; and these factors are in turn determined by the diameter of the tube and by the angle at which the severing cut is made. This is best illustrated in Figs. 5 and 6, which show the proportions and positions of two cutters suitable for cutting gaskets of different diameters, each at an angle of 45 degrees. The diameter of the tube shown in Fig. 6 is considerably larger than that shown in Fig. 5; and although the angle of the cut relative to the axial center of the tube is the same in both cases, it will be seen that the larger tube 41 may use a larger cutter 35, the cutting blade 36 of which is flared outwardly at a greater angle from the axis of the cutter than is the blade 38 of the smaller cutter 39 employed for the smaller tube 40, so as to conform to the larger cone of the larger tube. In this case also the axis of the cutter is disposed at a greater angle to the axis of the tube. These diameters and angles are easily ascertained by experiment. In setting these cutters it is considered advisable to set the inner surface of the flaring blade in coincidence with the line 15 of the cut, as shown in the figures, since this inner surface of the blades comes in contact with the remaining uncut and therefore less flexible portion of the tube; whereas the acute angled edges of the gaskets, being freed from the tube and therefore more flexible will readily pass over the outer beveled surface of the cutting blade, as illustrated at 42 in Fig. 6. The extent to which the cutting edges of these circular cutters penetrate and interlap with the cut surface of the gasket is best shown in Fig. 4, which is an isometric view taken substantially at right angles to the angle of the cut, as represented by the arrow 43 in Fig. 6. The numeral 31 represents the cutting edge of the cutter; while the numeral 44 indicates the external diameter of the tube; and the area included within the overlapping portions of these circles designates the area over which the cutter 35 must be in substantial conformity to the beveled end 45 of the tube, corresponding to the conical zone of cleavage between the gaskets, in order to cut the walls through cleanly and avoid scoring or scraping the cut surfaces. Whatever the form of cutter, or extent of its cutting blade, that portion of the blade and especially of its cutting edge, which extends into that conical zone of cleavage, should be curved or dished in substantial conformity with that zone. Or, in other words, any portion or segment of any blade which enters between the cut surfaces should be in approximate conformity with the curvature of those surfaces.

I claim as my invention:—

1. A cutter provided with an annular blade having a smooth, sharp and thin circular edge, both side faces of which are inclined to a substantial degree away from a right angle relation to the axial center of the cutter, whereby the cutter is adapted to perform its cutting action in a direction substantially oblique to the said axial center.

2. A cutter provided with a central stem and with an outwardly flaring blade having its inner and outer surfaces of decided and substantially conical contours, and meeting in a sharp smooth circular edge concentric with the stem.

3. A circular rotary cutter having a flat web merging into a flaring annular blade, the inner and outer faces of which flare to a substantial degree from a right angular relation to the axial center of the cutter and converge to a sharp, thin, circular edge extending in the general direction of its cutting action.

4. A cutter provided with a central stem and having a circular cutter blade extending outwardly from the stem, at first at substantially right angles with the stem, and then flaring at an acute angle with the stem, the two sides of the flaring portion being of differing conical contours converging to a cutting edge substantially concentric with the stem, and means for effecting the cutting action of the blade in the general direction of the flaring portion of the cutter.

5. Means for cutting acute angled gaskets from a tube of gasket material, having in combination means for supporting the tube, and a conical cutter supported at one side of the tube with its axis disposed at an angle with the longitudinal center of the tube, and having its cutting blade flared in substantial coincidence with the desired acute angle of the cut, the said blade having its circumferential extension disposed in substantial coincidence with that portion of the circumferential wall of the tube which is penetrated by the cutter.

6. Means for cutting acute angle gaskets from a tube of gasket material, having in combination means for supporting and rotating the tube, and a cutter provided with a conical blade for penetrating the wall of the tube at the desired acute angle, the flare of the blade adjacent to the edge being in substantial conformity to that portion of the beveled cut surface which is overlapped by the cutter.

7. Means for cutting acute angled gaskets from a tube of gasket material, having in combination means for supporting and rotating the tube, and a cutter therefor provided with a central stem, and having a conical cutting blade for penetrating the wall of the tube, the penetrating portion of the blade being in flare and in circumferential extension in substantial coincidence with the conical cut surface overlapped by the cutter.

8. Means for cutting acute angled gaskets from a tube of gasket material, having in combination means for supporting and rotating the tube, a cutter provided with a flaring cutting blade for penetrating the wall of the tube, means for supporting and rotating the cutter, and means for reciprocating the cutter to carry its conical blade through the wall of the tube in a direction substantially coinciding with the flare of the blade.

9. Means for cutting acute angled gaskets from a tube of gasket material, having in combination means for supporting and rotating the tube, a cutter having a conical cutting blade, means for supporting and rotating the cutter, means for reciprocating the cutter to carry its flaring blade through the wall of the tube in substantial coincidence with the line of the cut, and feeding means for locating the successive cuts at different positions longitudinally of the tube.

10. Means for cutting oblique angled gaskets from a tube of gasket material, having in combination means for supporting the tube, and a cutting blade inclined to the center of the tube, with its cutting edge extending obliquely across the direction of progress of its cutting action.

11. Means for cutting oblique angled gaskets from a tube of gasket material, having in combination means for supporting the tube, and a cutter having a blade inclined to the center line of the tube with its cutting edge curved and extending obliquely across the direction of progress of its cutting action.

12. Means for cutting oblique angled gaskets from a tube of gasket material, having in combination means for supporting the tube, and a cutting blade having its cutting edge curved in substantial conformity with that portion of the conical zone of cleavage which the said edge penetrates in the cutting operation.

13. In a machine of the character described, in combination, a tube-supporting mandrel, a carriage movable intermittently in the direction of the length of said mandrel, means for effecting intermittent movement of said carriage, and a rotatable knife movable simultaneously with said carriage and coöperating with said mandrel to effect the cutting of rings from a tube on the mandrel while the said carriage is at rest.

14. In a machine of the character described, in combination, a tube supporting mandrel, a carriage mounted adjacent to and intermittently movable parallel to said mandrel, a knife support mounted on said carriage to move simultaneously therewith, a rotary knife mounted on said support, and means to adjust said support on said carriage to position the knife with relation to said mandrel.

15. In a machine of the character described, in combination, a tube-supporting mandrel, a rotatable knife arranged with its cutting edge substantially at right angles to said mandrel and coöperating with a tube on said mandrel to successively cut the same into rings, a carriage intermittently movable longitudinally of the mandrel, a support for said knife mounted on said carriage to move simultaneously therewith, and means mounted on said carriage for moving said knife toward said mandrel, substantially as described.

16. In a machine of the character described, in combination, a tube-supporting mandrel, and a carriage, one of said parts being movable longitudinally with relation to the other intermittently, a rotatable knife, a support for said knife mounted on said carriage and movable toward a tube on said mandrel to cause the knife to engage therewith and cut the same into rings while the said movable part is at rest and to be disengaged therefrom while said movable part is in motion.

17. In a machine of the character specified, in combination, a tube-supporting mandrel, a rotatable knife cooperating with a tube on said mandrel to cut the same into rings, a support for said knife movable toward and from said mandrel, a carriage upon which said knife support is mounted, means for intermittently moving said carriage longitudinally with relation to said mandrel, and means for moving said knife-support toward said mandrel while the carriage is stationary, substantially as described.

18. In a machine of the character specified, in combination, a tube-supporting mandrel, and a rotatable disk knife cooperating therewith to cut rings from a tube on said mandrel, said disk knife having a cutting edge formed by beveled faces of different angles or inclinations, for the purpose specified.

19. In a machine of the character described, in combination, a tube-supporting mandrel, a rotatable knife cooperating therewith and bodily movable toward and from the same and longitudinally thereof, a carriage for said knife, means for intermittently feeding the said carriage longitudinally of said mandrel, means for effecting bodily movement of the knife toward said mandrel and means for varying the feed of the carriage, substantially as described.

20. In a machine of the character described, in combination, a tube-supporting mandrel, a carriage movable intermittently in the direction of the length of said mandrel, means for effecting intermittent movement of said carriage, a rotatable knife movable with said carriage and cooperating with said mandrel to effect the cutting of rings from a tube on the mandrel while the said carriage is at rest, and means for varying the length of movement of said carriage according to the thickness of the rings to be cut.

21. In a machine of the character described, in combination, a tube-supporting mandrel, and a knife-carrier, one of said parts being movable longitudinally with relation to the other, means for intermittently feeding said movable part, means for effecting successive engagement of the knife with a tube on said mandrel to cut the same into rings, and means for varying the intermittent feed to enable the machine to cut rings of different thickness, substantially as described.

22. A ring-cutting machine, comprising a tube-supporting mandrel, a carriage mounted adjacent to and movable parallel to said mandrel, a knife-support mounted on said carriage, a rotary knife mounted in said support, means for adjusting said support on said carriage to carry the knife toward and from the mandrel, and means for rotating said knife.

In testimony whereof I have signed my name to this specification in the presence of two subscribing witnesses this 25th day of April, 1907.

JOSEPH MERRITT.

Witnesses:
ALICE PATTISON MERRITT,
CAROLINE M. BRECKLE.